Patented Apr. 14, 1936

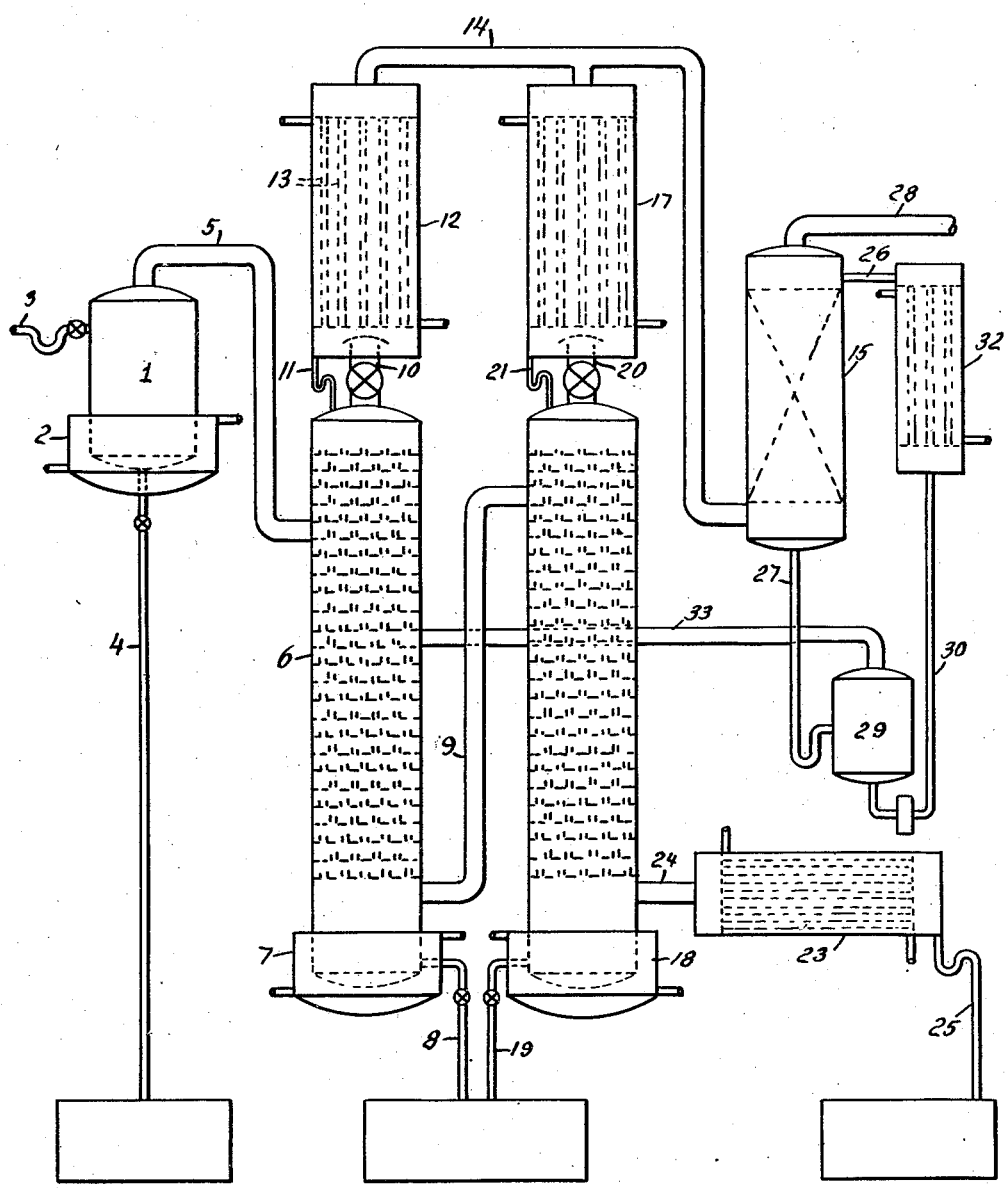

2,037,468

UNITED STATES PATENT OFFICE 2,037,468

APPARATUS FOR THE PURIFICATION OF CARBON BISULPHIDE

Andrew M. Harkness, Nyack, and Carl Iddings, Kew Gardens, N. Y., assignors to General Chemical Company, New York, N. Y., a corporation of New York Application September 16, 1932, Serial No. 633,410

4 Claims. (Cl. 202—154)

This invention relates to the purification of crude carbon bisulphide and in particular it relates to a process and apparatus for the treatment of crude carbon bisulphide vapors or liquids and recovery of a refined bisulphide product.

Carbon bisulphide may be manufactured by reaction of heated carbon, in the form of coke or charcoal for example, with sulphur vapors passed through the carbon in a retort. The sulphur reacts with the carbon forming carbon bisulphide which, at the temperatures used, is in the form of a gas admixed with vapors of unreacted sulphur and impurities such as hydrogen sulphide, oxides of carbon, carbonyl sulphide, etc. These vapors may be condensed by cooling them to form a crude liquid carbon bisulphide product which contains relatively large amounts of the impurities present in the gases. This invention is directed to a method for the recovery of a refined bisulphide product from the gas as it comes from the retort or from crude carbon bisulphide liquid obtained from the gas.

It is an object of this invention to provide a process whereby the crude carbon bisulphide may be separated from impurities such as the sulphur which have a boiling point above the boiling point of carbon bisulphide and also from impurities which, like hydrogen sulphide, have a boiling point lower than the boiling point of carbon bisulphide. It is an object of this invention to provide both a process and an apparatus for carrying out the process, whereby a purified carbon bisulphide product may be continuously and economically obtained from a crude bisulphide. It is likewise an object of this invention to provide an apparatus suitable for carrying out this distillation and separation of carbon bisulphide from the crude liquid or retort gases.

In treating crude liquid carbon bisulphide in accordance with this invention, the crude liquid is heated to distill off the carbon bisulphide and impurities having a boiling point lower than carbon bisulphide. Higher boiling impurities which principally consist of sulphur, in part remain behind as a residue in this distillation step and in part mingle with the distilled vapors and enter the following stages of treatment of these vapors.

When the gaseous products as they come from a carbon bisulphide retort are to be treated in accordance with this invention, the gases are cooled to about 135° C., at which temperature high boiling impurities condense out but the carbon bisulphide and low boiling impurities remain in the vapors.

The vapors from the first distillation or after the preliminary cooling of the retort gases, are subjected to a rectification treatment which may be carried out in a plurality of stages. In a rectification stage, the vapors are introduced into a rectifying column and are contacted with a reflux of condensate from the vapors. The portion of the incoming vapors which is not condensed to provide this reflux, and which consists principally in impurities having a lower boiling point than carbon bisulphide, are withdrawn and may be treated with a solvent for carbon bisulphide to recover carbon bisulphide carried over with the impurities. The refluxed condensate is heated in a still to volatilize carbon bisulphide therefrom and a portion of the vapors is passed in contact with the refluxed condensate while another portion is withdrawn. The withdrawn vapors may be condensed as carbon bisulphide product or, without condensation, may be further treated in additional stages where they are subjected to purification treatments of the same kind as described above. The refluxed carbon bisulphide condensate dissolves the sulphur in the crude vapors. This sulphur remains as a liquid residue in the bottom of the still where the condensate is vaporized and the residue may be returned with the sulphur residue from the preliminary distillation of the crude liquid carbon bisulphide or from the cooling of the retort gases for reaction with carbon to form additional carbon bisulphide. The number of stages of rectification of the vapors employed may be varied according to the degree of purity required in the final carbon bisulphide product.

The vapor impurities uncondensed in the above described purification of carbon bisulphide, which contain the impurities of lower boiling point together with some carbon bisulphide, may be economically treated for the recovery of their carbon bisulphide content by washing with a solvent such as cool anthracene oil. The carbon bisulphide may be recovered from solution by heating this oil to vaporize the carbon bisulphide, which may be returned for treatment with the vapors distilled from the crude liquid carbon bisulphide. The anthracene oil from which carbon bisulphide has been evolved by heating may be cooled and again used for the absorption of carbon bisulphide from the uncondensed vapors leaving the purification stages.

For a fuller understanding of the nature and objects of this invention, reference may be had to the following detailed description taken in connection with the accompanying drawing which shows a view, partly in cross section, of an example of the apparatus of this invention suitable for treating a crude liquid carbon bisulphide.

In the drawing, the numeral 1 indicates a vaporizer vessel provided with a steam jacket 2. The vaporizer is in communication with a pipe 3 which serves for the introduction of crude liquid carbon bisulphide, a pipe 4 communicating with the bottom of the vaporizer for removal therefrom of liquid sulphur residue and a pipe 5 leading off from the top of the vaporizer for conducting away vaporized carbon bisulphide. Pipe 5 communicates with the upper portion of a vertically disposed rectifying column 6. Rectifying column 6 may be provided with bubbling plates, packing, or any other desired means for intimately contacting liquid and gas passed countercurrently in the column. A bottom section of column 6 is provided with a heater, which in the apparatus shown is a steam jacket 7, and with a draw-off pipe 8. A vapor conduit 9 communicates with the bottom section of column 6 above steam jacket 7. A vapor conduit 10 and liquid return pipe 11 communicate between the top of column 6 and the bottom of a cooler 12. Cooler 12 may be, for example, of the shell and tube type with the gases and vapors from column 6 passed inside tubes 13 and a cooling fluid, such as cold water passed around the tubes. A pipe 14 communicates with the top of cooler 12 and serves to conduct gases and vapors from column 6 which are uncondensed in cooler 12 into the bottom of an absorber 15.

A second rectifying column 16 and cooler 17 are provided, like column 6 and cooler 12, with a steam jacket 18 for the bottom of column 16, a draw-off pipe 19 and a vapor conduit 20 and a liquid return pipe 21 communicating between the column and cooler. The top of cooler 17 communicates with a branch 22 of pipe 14. Vapor conduit 9 communicates with an upper section of column 16 thus connecting the pair of columns 6 and 16 in series. A condenser 23 communicates through a vapor pipe 24 with the bottom section of column 16 above jacket 18. A pipe 25 serves for drawing off liquid carbon bisulphide product condensed in condenser 23.

Absorber 15 may consist of a tower containing a packing over which a liquid absorbent for carbon bisulphide introduced into the top of the tower from a pipe 26 and passed downwardly through the tower to outlet pipe 27, is intimately contacted with vapors from pipe 14 entering the bottom of the tower and passed upwardly therethrough to gas exit pipe 28. Outlet pipe 27 communicates with a heater 29 from which a pipe 30 leads through a pump 31 to a cooled 32 which in turn communicates through pipe 26 with absorption tower 15. A vapor draw-off pipe 33 leads from heater 29 into a midportion of rectifying column 6.

In employing the apparatus described above for the purification of crude liquid carbon bisulphide, the crude liquid contaminated with sulphur, hydrogen sulphide, carbon oxysulphide and other impurities is passed into vaporizer 1 wherein the carbon bisulphide is vaporized. The vapors and gases comprising a mixture of carbon bisulphide and impurities enter the top portion of the first rectifying column 6 of the series of two columns. Sulphur contained in the crude liquid carbon bisulphide accumulates in the bottom of the vaporizer and may be periodically withdrawn in a molten condition through pipe 4.

The carbon bisulphide vapors from vaporizer 1 enter the first rectifying column near the top of the column where they are met by a descending current of refluxed carbon bisulphide from cooler 12 passing into the top of the column through liquid return pipe 11. The vapors and gases pass upwardly through the upper portion of column 6 in intimate contact with the carbon bisulphide reflux and enter cooler 12 through vapor conduit 10 where the carbon bisulphide is condensed and is returned through pipe 11 into the top of column 6. The velocities at which the vapors and condensate flow in countercurrent contact with each other in the upper portion of the rectifying column may be materially less than the velocities in the cooler. The uncondensed vapors pass out of cooler 12 through pipe 14 to absorbing tower 15. The condensate flowing downwardly from the cooler into column 6 carries with it sulphur and other impurities which are in the incoming vapors from vaporizer 1. Low boiling impurities, both entrained and in solution in the condensate, are separated therefrom by the treatment with the incoming vapors, and these vapors in turn are cooled to condense out a portion of the carbon bisulphide in the rectifying column before they pass into the cooler, thus relieving the burden of this portion of the apparatus.

The sulphur in solution in the carbon bisulphide is carried to the bottom of the tower where the carbon bisulphide is vaporized by means of steam introduced into jacket 7. A portion of the vapors thus formed pass upwardly in column 6 in contact with the downwardly flowing liquid carbon bisulphide and serve to evolve impurities having a lower boiling point than carbon bisulphide from the liquid. These low boiling impurities pass upwardly through the column to be mingled with the incoming crude vapors from pipe 5. Another portion of the vapors formed in the bottom of column 6 is withdrawn from the column through vapor conduit 9 and passed into the upper portion of column 16. The concentration of sulphur in the liquid carbon bisulphide in the bottom of column 6 gradually increases, and this solution of sulphur in carbon bisulphide may be periodically withdrawn through draw-off pipe 8 and either cooled to crystallize out the sulphur and the remaining carbon bisulphide returned to vaporizer 1, or the solution without removal of sulphur may be directly returned to vaporizer 1.

The carbon bisulphide vapors withdrawn through vapor conduit 9 are of materially greater purity than the vapors entering column 6 from vaporizer 1 and, if desired, they may be cooled to condense the carbon bisulphide. In the apparatus shown in the drawing, however, they are subjected in column 16 and cooler 17 to a treatment like that of the vapors from vaporizer 1 in column 6 and cooler 12. Thus, in column 16, the incoming vapors from conduit 9 pass upwardly through the upper portion of the column in contact with downwardly flowing carbon bisulphide from cooler 17 and thence to cooler 17 where carbon bisulphide is condensed from the vapors and the condensate returned through liquid return pipe 21 to the top of column 16. The uncondensed vapors or gases pass out of the cooler through branch 22 to pipe 14 and thence to absorbing tower 15. The condensed liquid carbon bisulphide flows downwardly through column 16 and in the bottom of the column is heated to vaporize carbon bisulphide. A portion of the vapors formed in the bottom of column 16 rises in the column in countercurrent to the descending liquid to evolve therefrom lower boiling impurities and another portion of the vapors is drawn off from the bottom section of column 16 through pipe 24 to condenser 23. As sulphur accumulates in the liquid in the bottom of column 16, the solution is withdrawn from the column and treated as described above for the solution withdrawn from column 6. In condenser 23, the purified vaporous carbon bisulphide is condensed to a liquid which is withdrawn from the cooler through pipe 25 as purified carbon bisulphide product.

The gaseous and vaporous impurities passing out of the tops of coolers 12 and 17 principally consist of compounds of a lower boiling point than carbon bisulphide but also contain carbon bisulphide vapors. In absorption tower 15, these gases and vapors are contacted with a liquid absorbent for carbon bisulphide such as, for example, anthracene oil which absorbs the carbon bisulphide. The remaining unabsorbed gases and vapors pass out of absorption tower 15 through pipe 28 and may be treated in any desired manner. The solution of carbon bisulphide in anthracene oil is passed to heater 29, where by raising the temperature of the solution carbon bisulphide is vaporized therefrom. The heated oil from heater 29 is recirculated by means of pump 31 through a cooler 32, where the oil is cooled to a temperature suitable for again returning it to absorption tower 15 for treatment of additional quantities of gases and vapors entering from pipe 14. The vapors evolved from the oil in the heater are returned through draw-off pipe 33 and introduced into the mid-portion of rectifying column 6 where they pass upwardly in contact with the descending flow of liquid carbon bisulphide and are treated in the column and cooler 12 with the crude carbon bisulphide vapors from vaporizer 1. The low boiling vapors are thus separated from the carbon bisulphide and any oil which may be carried with the vapors and pass out of column 6 and cooler 12, while the oil and carbon bisulphide are carried down into the bottom of the column. The carbon bisulphide is vaporized and recovered as pure product, while the oil remains in the sulphur-carbon bisulphide solution withdrawn from the column through pipe 8.

When the impure gases from a carbon bisulphide retort are to be treated without first condensing crude liquid, the apparatus shown in the drawing may be modified to substitute a cooler for the vaporizer. The retort gases are then passed through the cooler where their temperature is lowered sufficient to condense out high boiling impurities but not enough to condense the carbon bisulphide. The cooled vapors are then passed through pipe 5 of the apparatus shown in the drawing and treated as described above.

While a particular apparatus and process embodying our invention has been described in detail for purposes of illustration, the invention is not limited to the specific features of the example. Thus, while we have described an apparatus employing a series of two rectifying columns and associated coolers, a greater or lesser number may be employed depending upon the degree of purity required in the final product.

We claim:

1. In combination in an apparatus for the purification of crude liquid carbon bisulphide, a vaporizer, a rectifying column, a vapor conduit communicating between said vaporizer at a point above the normal liquid level in said vaporizer and the upper portion of said column, a vapor conduit communicating with the top of said column, a heater for the bottom portion of the column and a vapor conduit communicating with the bottom portion of the column above said heater.

2. In combination in an apparatus for the purification of crude liquid carbon bisulphide, a vaporizer, a rectifying column, a vapor conduit communicating between said vaporizer at a point above the normal liquid level in said vaporizer and the upper portion of said column, a cooler, a vapor conduit and a liquid return conduit communicating between the top of said column and said cooler, a heater for the bottom portion of the column and a vapor conduit communicating with the bottom portion of the column above said heater, an absorbing tower, and a gas conduit communicating between the absorbing tower and the aforesaid cooler.

3. In combination in an apparatus for the purification of crude liquid carbon bisulphide, a vaporizer, a plurality of vertically arranged rectifying columns and coolers, means connecting the top of each of said columns with a cooler arranged for flow of vapor to the cooler and return of liquid to the column, heaters for the bottom portions of said columns, a vapor conduit connecting a bottom section of one of a pair of said columns with an upper section of the other column of the pair, said columns being thus connected in series, a vapor conduit connecting said vaporizer at a point above the normal liquid level in said vaporizer with an upper section of the first of the columns in the series, and a condenser in communication with the bottom section of the last of said columns in the series.

4. In combination in an apparatus for the purification of crude liquid carbon bisulphide, a vaporizer, a plurality of vertically arranged rectifying columns and coolers, means connecting the top of each of said columns with a cooler arranged for flow of vapor to the cooler and return of liquid to the column, heaters for the bottom portions of said columns, a vapor conduit connecting a bottom section of one of a pair of said columns with an upper section of the other column of the pair, said columns being thus connected in series, a vapor conduit connecting said vaporizer at a point above the normal liquid level in said vaporizer with an upper section of the first of the columns in the series, a condenser in communication with the bottom section of the last of said columns in the series, an absorption tower, a heater and a cooler, and means for recirculating a fluid therethrough, and a vapor conduit connecting said heater and a mid-portion of the first rectifying column of the aforesaid series of columns.

ANDREW M. HARKNESS.
CARL IDDINGS.